(12) United States Patent
Hedman (10) Patent No.: US 11,421,776 B2
(45) Date of Patent: Aug. 23, 2022

(54) AUXILIARY TRANSMISSION BRAKE ARRANGEMENT

(71) Applicant: VOLVO TRUCK CORPORATION, Gothenburg (SE)

(72) Inventor: Anders Hedman, Marstrand (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 253 days.

(21) Appl. No.: 16/771,117

(22) PCT Filed: Dec. 21, 2017

(86) PCT No.: PCT/EP2017/084016
§ 371 (c)(1),
(2) Date: Jun. 9, 2020

(87) PCT Pub. No.: WO2019/120534
PCT Pub. Date: Jun. 27, 2019

(65) Prior Publication Data
US 2021/0172510 A1 Jun. 10, 2021

(51) Int. Cl.
*F16H 57/04* (2010.01)
*B60T 1/087* (2006.01)
(Continued)

(52) U.S. Cl.
CPC ..... *F16H 57/0456* (2013.01); *F16H 57/0446* (2013.01); *B60T 1/087* (2013.01);
(Continued)

(58) Field of Classification Search
CPC ............ F16H 57/0456; F16H 57/0446; F16H 57/0435; F16H 2061/0037; B60T 1/087; B60T 8/3215
See application file for complete search history.

(56) References Cited

U.S. PATENT DOCUMENTS 3,131,582 A * 5/1964 Kelbel ................ F16H 57/0446
184/6.12
4,211,313 A * 7/1980 Quick ................. F16H 57/0412
192/113.36
(Continued)

FOREIGN PATENT DOCUMENTS

DE 102004002045 A1 8/2005
EP 2258593 A2 12/2010
(Continued)

OTHER PUBLICATIONS

China Office Action dated Feb. 3, 2021 in corresponding China Patent Application No. 201780097782.7, 11 pages.
(Continued)

*Primary Examiner* — Michael A Riegelman
(74) *Attorney, Agent, or Firm* — Venable LLP; Jeffri A. Kaminski (57) ABSTRACT

The present invention relates to an auxiliary transmission brake arrangement (100) for a transmission (10) of a vehicle. In particular, the invention relates to an auxiliary transmission brake arrangement comprising a lubrication arrangement for improved lubrication of gear wheels connecting the auxiliary transmission brake arrangement to an output shaft.

16 Claims, 4 Drawing Sheets

(51) Int. Cl.
*B60T 8/32* (2006.01)
*F16H 61/00* (2006.01)

(52) U.S. Cl.
CPC ......... *B60T 8/3215* (2013.01); *F16H 57/0435* (2013.01); *F16H 2061/0037* (2013.01)

(56) References Cited

U.S. PATENT DOCUMENTS

| | | | | |
|---|---|---|---|---|
| 4,257,504 | A * | 3/1981 | Hanke | F16D 57/04 192/12 A |
| 5,518,098 | A * | 5/1996 | Zanetel | F16H 3/12 192/70.12 |
| 7,223,206 | B2 * | 5/2007 | Eriksson | B60W 10/184 477/94 |
| 10,487,936 | B2 * | 11/2019 | Kishimoto | F16H 57/0484 |
| 2006/0102117 | A1 * | 5/2006 | Rabhi | F01L 1/34 123/90.16 |
| 2006/0199698 | A1 * | 9/2006 | Eriksson | B60W 30/1819 477/92 |
| 2008/0078173 | A1 * | 4/2008 | Cronin | F16H 61/0031 60/389 |
| 2008/0236158 | A1 * | 10/2008 | Shimizu | F16H 61/0009 60/468 |
| 2012/0180466 | A1 * | 7/2012 | Bischoff | B60T 10/02 60/347 |
| 2012/0247911 | A1 * | 10/2012 | Noda | B60K 6/365 192/113.32 |
| 2013/0133766 | A1 * | 5/2013 | Hwang | F16H 61/0021 137/565.13 |
| 2014/0179477 | A1 * | 6/2014 | Yamamoto | F16H 61/0031 903/902 |
| 2015/0316144 | A1 * | 11/2015 | Yoshitani | F16H 57/0441 475/31 |
| 2016/0116053 | A1 * | 4/2016 | Nystrom | F16H 57/0436 184/6.1 |
| 2017/0089402 | A1 * | 3/2017 | Deakin | B60K 6/10 |
| 2017/0261094 | A1 * | 9/2017 | Kishimoto | F16D 25/08 |
| 2017/0284510 | A1 * | 10/2017 | Iwaki | F16H 57/031 |
| 2018/0274564 | A1 * | 9/2018 | Digesù | F16H 61/4078 |
| 2018/0347691 | A1 * | 12/2018 | Wurster | F16H 57/0417 |
| 2020/0055492 | A1 * | 2/2020 | Van Dingenen | F01P 3/20 |
| 2020/0378492 | A1 * | 12/2020 | Van Druten | F16H 61/0206 |
| 2021/0172510 | A1 * | 6/2021 | Hedman | F16D 57/04 |

FOREIGN PATENT DOCUMENTS

| | | |
|---|---|---|
| EP | 3217041 A1 | 9/2017 |
| WO | 2004108467 A1 | 12/2004 |

OTHER PUBLICATIONS

International Search Report and Written Opinion dated Sep. 28, 2018 in corresponding International PCT Application No. PCT/EP2017/084016, 11 pages.

* cited by examiner

AUXILIARY TRANSMISSION BRAKE ARRANGEMENT

CROSS-REFERENCE TO RELATED APPLICATIONS

This application is a U.S. National Stage application of PCT/EP2017/084016, filed Dec. 21, 2017, and published on Jun. 27, 2019, as WO 2019/120534 A1, all of which is hereby incorporated by reference in its entirety.

TECHNICAL FIELD

The present invention relates to an auxiliary transmission brake arrangement for a transmission of a vehicle. The invention also relates to a corresponding method for controlling such an auxiliary transmission brake arrangement. The invention is applicable on vehicles, in particularly low, medium and heavy duty vehicles commonly referred to as trucks. Although the invention will mainly be described in relation to a truck, it may also be applicable for other types of vehicles.

BACKGROUND

In connection to low-, medium and heavy duty vehicles, also commonly referred to as trucks, a transmission arrangement is connected to a prime mover for controlling torque loads from the prime mover to the propelled wheels of the truck. Hereby, a variety of ratios between the input shaft and the output shaft of the transmission arrangement can be obtained.

The transmission arrangement may also comprise an auxiliary transmission brake, also commonly referred to as a retarder. The auxiliary transmission brake serves as an additional brake, for use, either on its own or in combination with e.g. the wheel brakes when reducing the vehicle speed. The auxiliary transmission brake is beneficial as it is able to provide a relatively high and continuous braking power. Often, the auxiliary transmission brake is arranged to provide a brake torque to the output shaft of the transmission arrangement for reducing the rotational speed thereof.

According to a particularly advantageous embodiment, the auxiliary transmission brake may be drivingly connected to the output shaft via a transmission gear set. The transmission gear set may comprise a number of gear wheels, which are arranged to provide an increased rotational speed of the auxiliary transmission brake in comparison to the rotational speed of the output shaft.

However, connecting the auxiliary transmission brake to the output shaft via the transmission gear set requires lubrication and cooling for that transmission gear set when being exposed to loading. When the auxiliary transmission brake is not in operation, there is no or just a very small lubrication requirement. Thus, providing lubrication when the auxiliary transmission brake is not in operation increases the energy consumption and is thus not desirable.

According to a previous solution, the transmission gear set is connected to the output shaft via a clutch. Hereby, when the auxiliary transmission brake is not in operation, the clutch disconnects the transmission gear set from the output shaft.

However, such solution is rather costly and its response time is unfavorable. Also, if the engagement of the clutch would fail, there would be no braking action by the auxiliary transmission brake. There is thus a desire to provide a solution for improving the lubrication and cooling of the transmission gear set in an auxiliary transmission brake application.

SUMMARY

It is an object of the present invention to provide an auxiliary transmission brake arrangement which at least partially overcomes the above described deficiencies. This is achieved by an auxiliary transmission brake arrangement according to claim 1.

According to a first aspect of the present invention, there is provided an auxiliary transmission brake arrangement for a transmission of a vehicle, the auxiliary transmission brake arrangement comprising an auxiliary transmission brake arranged to controllably provide an auxiliary brake torque to an output shaft of the transmission; an auxiliary transmission brake valve arranged in fluid communication with the auxiliary transmission brake and connectable to a source of pressurized fluid of the vehicle, the auxiliary transmission brake valve being controllable between a first state in which pressurized fluid is provided to the auxiliary transmission brake for actuation thereof, and a second state in which pressurized fluid is prevented from reaching the auxiliary transmission brake; a gearing arrangement comprising a first and a second gear wheel arranged in meshed connection with each other, the first gear wheel being drivingly connected to the auxiliary transmission brake and the second gear wheel being drivingly connected to the output shaft of the transmission; and a lubrication arrangement connected to the transmission, the lubrication arrangement comprising a lubrication actuator arranged to supply lubricant to the gearing arrangement when being actuated, wherein the auxiliary transmission brake valve is further arranged in fluid communication with the lubrication actuator such that pressurized fluid is supplied to the lubrication actuator for actuation thereof when the auxiliary transmission brake valve assumes the first state.

The wording "auxiliary transmission brake" should be understood as an arrangement in the transmission which is configured to reduce the speed of the vehicle by providing a brake torque to the output shaft of the transmission. The auxiliary transmission brake may preferably be a so-called retarder. The auxiliary transmission brake is, as described above, drivingly connected to the output shaft via a gearing arrangement. Drivingly connected should be construed such that the rotational speed of the output shaft and the rotational speed of the auxiliary transmission brake are proportional to each other. Preferably, the gearing arrangement is configured such that the rotational speed of the auxiliary transmission brake is higher than the rotational speed of the output shaft. The gearing arrangement is in such configuration arranged as a step-up gear. In such configurations, the auxiliary transmission brake will operate at an increased speed, which makes it possible to reduce the size, weight and cost of such auxiliary transmission brake.

Also, the auxiliary transmission brake valve may be continuously controllable between the first and second states. Hereby, the auxiliary transmission brake valve can control pressurized fluid from being fully prevented from reaching the auxiliary transmission brake to being fully allowed to be provided to the auxiliary transmission brake, and anything there between. The first state may thus be seen as a state where various ratio of pressurized fluid can be supplied to the auxiliary transmission brake.

Moreover, the auxiliary transmission brake is preferably actuated by means of providing pressurized fluid, such as e.g. pressurized air, to the auxiliary transmission brake. The pressurized fluid preferably acts on a fluid in a reservoir. This pressure pushes the fluid out of the reservoir and into the rotating parts of the auxiliary transmission brake, whereby a braking action results. Preferably, the higher the controlling pressurized fluid is, the larger the braking action will be.

The inventor of the present disclosure has realized that lubrication and cooling of the gearing arrangement is necessary when the auxiliary transmission brake is actuated and in operation, and that the lubrication and cooling of the step-up gear set teeth can be controlled by means of the pressurized fluid that is used for controlling the auxiliary transmission brake.

An advantage is thus that lubrication, as well as cooling of the gearing arrangement is performed when the auxiliary transmission brake is actuated. The auxiliary transmission brake valve should thus be construed as a valve which controls the supply of such pressurized fluid to the auxiliary transmission brake, as well as to the lubrication actuator. When the auxiliary transmission brake is inactive, such lubrication and cooling may be more or less superfluous. Accordingly, it is ensured that lubrication and cooling is provided when desired as well as improving the energy consumption of the transmission as lubrication is not provided when the auxiliary transmission brake is inactive.

According to an example embodiment, the lubrication actuator may be a flow controllable lubrication valve, the flow controllable lubrication valve being controllable in an open position for supplying lubricant to the gearing arrangement when receiving pressurized fluid from the auxiliary transmission brake valve.

As described above, lubricant is provided only when the auxiliary transmission brake is actuated.

According to an example embodiment, the flow controllable lubrication valve may be arranged in the open position when the pressure level of the pressurized fluid exceeds a predetermined pressure limit.

Hereby, lubricant is provided to the gearing arrangement when the braking level of the auxiliary transmission brake is above a certain limit. Lubrication and cooling may be less desirable when the brake level of the auxiliary brake is low, i.e. when the mesh forces between the gear teeth of the first and second gear wheels are low. Hereby, it is even further ensured that superfluous lubrication is prevented.

The predetermined pressure limit may be set at different levels depending on e.g. the application and specific transmission and/or auxiliary transmission brake being used, etc.

According to an example embodiment, the flow controllable lubrication valve may be a variable flow controllable lubrication valve, wherein the openness degree of the variable flow controllable lubrication valve is dependent on the pressure level of the pressurized fluid received from the auxiliary transmission brake valve.

Hereby, the more brake pressure provided by the auxiliary transmission brake, the more lubricant is provided to the gearing arrangement. Accordingly, the flow controllable lubrication valve allows more lubricant to be provided to the gearing arrangement when the brake pressure of the auxiliary transmission brake increases.

According to an example embodiment, the variable flow controllable lubrication valve may be arranged in a fully open position when the pressure level of the pressurized fluid exceeds the predetermined pressure limit.

Hereby, when the pressure level of the auxiliary transmission brake exceeds the above defined predetermined pressure limit, the valve is fully open. Hereby, the valve can be closed until the predetermined pressure limit is reached, or it can be partially open in dependence of the pressure level of the auxiliary transmission brake, and thereafter fully open when the pressure level corresponds to the predetermined pressure limit. If the pressure exceeds the predetermined pressure level, the valve is then kept fully open.

According to an example embodiment, the auxiliary transmission brake arrangement may further comprise a control unit, the control unit being arranged to receive a signal indicative of a braking request for the vehicle, and control the auxiliary transmission brake valve to be arranged in the first state.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The braking request may e.g. be received from the operator, cruise control, or when the wheel brakes are unable to reduce the vehicle speed sufficiently, etc.

According to an example embodiment, the second gear wheel may be fixedly connected to the output shaft.

Hereby, the second gear wheel continuously rotates with the rotation of the output shaft.

According to an example embodiment, the auxiliary transmission brake arrangement may further comprise a nozzle arranged in downstream fluid communication with the lubrication actuator for supplying the lubricant to the gearing arrangement.

The wording "downstream" should be construed such that the nozzle receives lubricant after it has been transported through the lubrication actuator.

The nozzle may thus preferably distribute the lubricant to the gearing arrangement. The nozzle may be arranged to supply lubricant to either the first or the second gear wheels, or to the interconnection between the first and second gear wheels.

According to an example embodiment, the nozzle may be a spray nozzle arranged to spray a fume of lubricant towards the first gear wheel. The nozzle may of course also be arranged to provide lubricant in the form of e.g. droplets, etc.

According to an example embodiment, the lubrication arrangement may be arranged to supply lubricant towards the second gear wheel.

According to an example embodiment, the auxiliary transmission brake arrangement may further comprise a lubricant level controlling arrangement arranged in fluid communication between the lubrication actuator and a lower portion of a gearbox housing for the transmission, wherein the lubricant level controlling arrangement is arranged to remove lubricant from, or add lubricant to, the lower portion.

Hereby, so-called dip lubrication of the gearing arrangement is achieved. Lubricant is filled up in the lower portion of the gearbox housing such that the second gear wheel is "dipped" into the lubricant. As is described below, when the auxiliary transmission brake assumes the second state, i.e. is deactivated, the lubricant level controlling arrangement removes the lubricant from the lower portion of the gearbox housing.

According to an example embodiment, the lubricant controlling arrangement may be arranged to remove lubricant from the lower portion of the gearbox housing when the auxiliary transmission brake valve assumes the second state.

The lubricant controlling arrangement may also be arranged to remove lubricant from the lower portion of the gearbox housing when the pressure from the valve is below a predetermined threshold level.

According to a second aspect, there is provided a method for controlling an auxiliary transmission brake arrangement for a transmission of a vehicle, the auxiliary transmission brake arrangement comprising an auxiliary transmission brake arranged to controllably provide an auxiliary brake torque to an output shaft of the transmission; a gearing arrangement comprising a first and a second gear wheel arranged in meshed connection with each other, the first gear wheel being drivingly connected to the auxiliary transmission brake and the second gear wheel being drivingly connected to the output shaft of the transmission; and a lubrication arrangement connected to the transmission and arranged to supply lubricant to the gearing arrangement, the method comprising the steps of supplying pressurized fluid to the auxiliary transmission brake arrangement upon a braking request; providing a first portion of the supplied pressurized fluid to the auxiliary transmission brake for actuation thereof; providing a second portion of the supplied pressurized fluid to the lubrication arrangement for actuation thereof; and providing lubricant from the lubrication arrangement to the gearing arrangement.

Effects and features of the second aspect are largely analogous to those described above in relation to the first aspect.

According to a third aspect, there is provided a vehicle comprising a transmission provided with an auxiliary transmission brake arrangement according to any one of the embodiments described above in relation to the first aspect.

According to a fourth aspect, there is provided a computer program comprising program code means for performing any of the steps described above in relation to the second aspect when the program is run on a computer.

According to a fifth aspect, there is provided a computer readable medium carrying a computer program comprising program means for performing any of the steps described above in relation to the second aspect when the program means is run on a computer.

Effects and features of the third, fourth and fifth aspects are largely analogous to those described above in relation to the first aspect.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
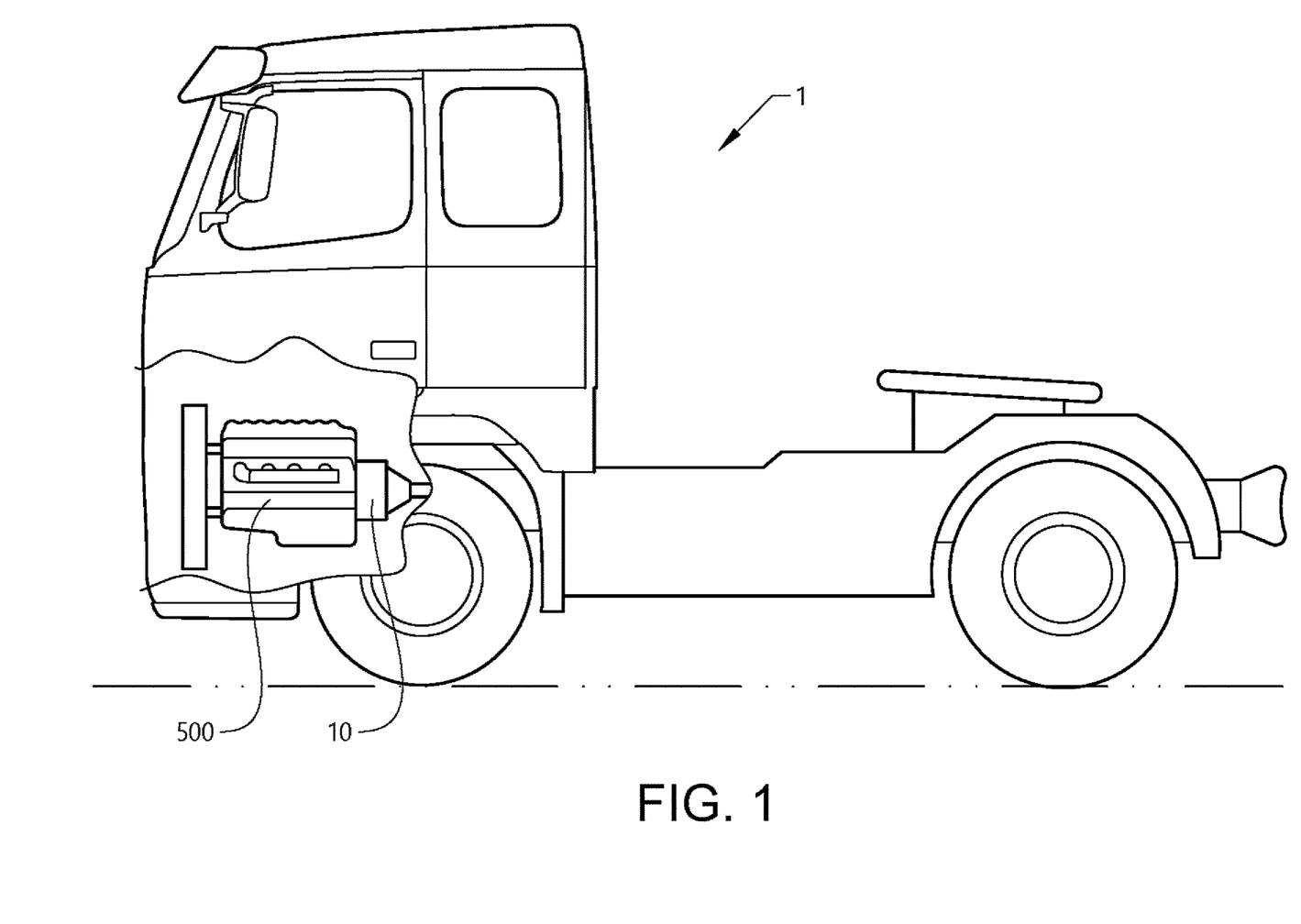
FIG. 1 is a lateral side view illustrating an example embodiment of a vehicle in the form of a truck.

With particular reference to FIG. 1, there is provided a vehicle 1 in the form of a truck. The vehicle 1 comprises a prime mover 500 in the form of an internal combustion engine arrangement 500, and a transmission 10 connected to the prime mover 500. The vehicle 1 in FIG. 1 is particularly suitable for utilizing a transmission 10 described below in relation to the description of FIGS. 2-3.

Figure 2:
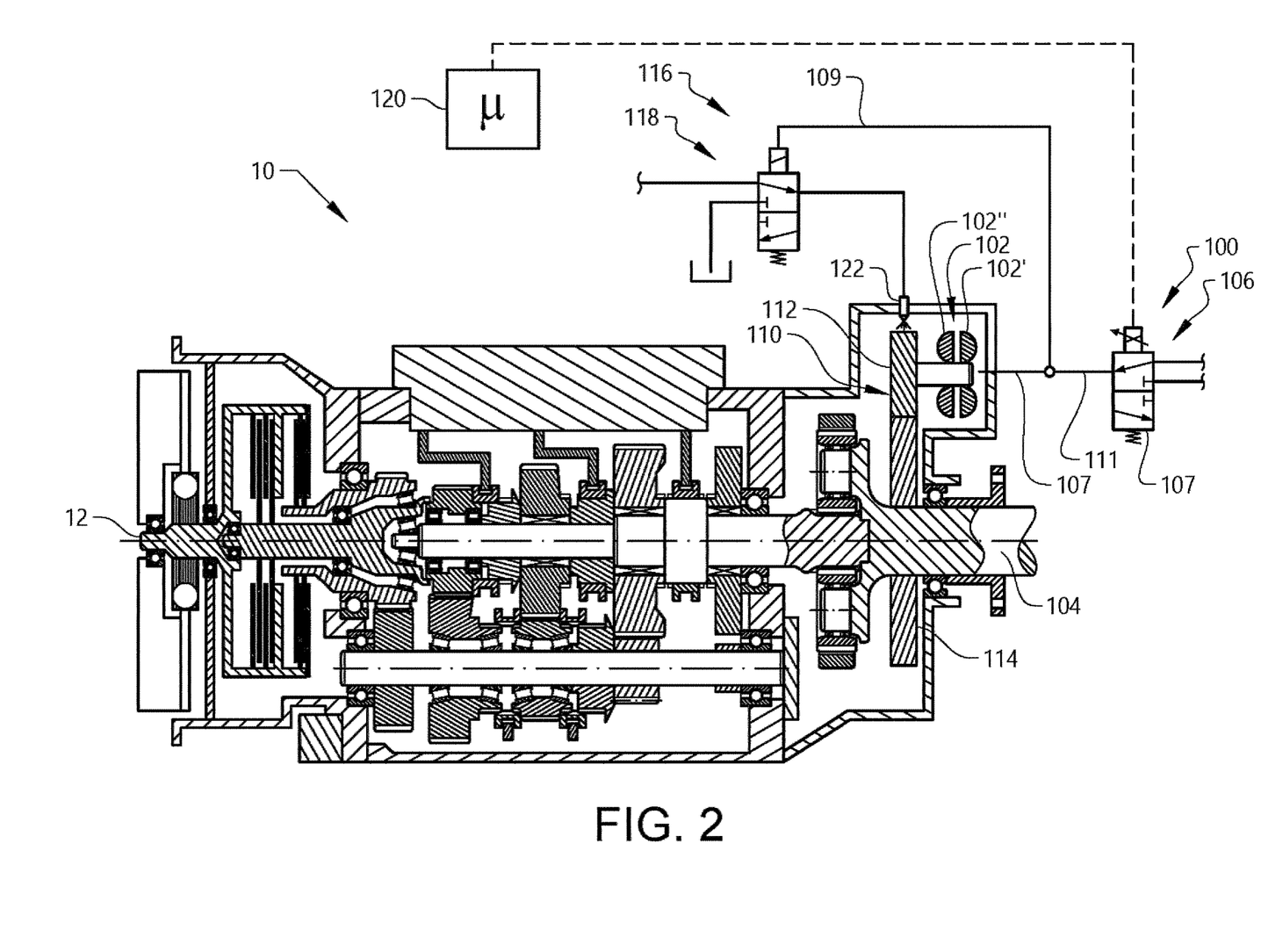
FIG. 2 is a cut-out side view of an auxiliary transmission brake arrangement positioned in a transmission according to an example embodiment.

Turning to FIG. 2, which is a cut-out side view of an auxiliary transmission brake arrangement 100 positioned in a transmission 10 according to an example embodiment. The transmission 10 comprises an input shaft 12 arranged to receive an input torque from the prime mover (500 in FIG. 1), and an output shaft 104 arranged to supply an output torque to the wheels of the vehicle 1. The transmission 10 is thus arranged to provide a number of different gears, including reverse gears for the vehicle. No further description will however be given to the gears and gear shifts.

As further illustrated in FIG. 2, the transmission 10 comprises an auxiliary transmission brake arrangement 100. The auxiliary transmission brake arrangement 100 comprises an auxiliary transmission brake 102 drivingly connected to the output shaft 104. The auxiliary transmission brake 102 will in the following also be referred to as a retarder 102.

The retarder 102 is thus a braking arrangement which is arranged to controllably provide a brake torque to the output shaft 104 of the transmission 10 for reducing the vehicle speed. The retarder 102 depicted in FIG. 2 comprises a static retarder portion 102' and a dynamic retarder portion 102". The dynamic retarder portion 102" is drivingly connected to the output shaft 104 via a gearing arrangement 110. Hence, the dynamic retarder portion 102" rotates as the output shaft 104 rotates. To achieve retardation, the retarder 102 preferably uses hydraulic fluid providing viscous drag forces between the static retarder portion 102' and the dynamic retarder portion 102". The hydraulic fluid is preferably provided in a reservoir (not shown). When actuating the retarder 102, pressurized fluid pushes the hydraulic fluid out from the reservoir and into the volume formed between the static 102' and dynamic 102" retarder portions.

As depicted in FIG. 2, the gearing arrangement 110 comprises a first 112 and a second 114 gear wheel arranged in meshed connection with each other. As can be seen in FIG. 2, the first gear wheel 112 is connected to the retarder 102 and the second gear wheel 114 is connected to the output shaft 104. However, it should be readily understood that the auxiliary transmission brake arrangement 100 may comprise further gear wheels between the retarder 102 and the output shaft 104. For example, one or more gear wheels may be arranged in meshed connection with the first gear wheel 112 between the retarder 102 and the first gear wheel 112. Also, one or more gear wheels may be arranged in meshed connection with the second gear wheel 114 between the output shaft 104 and the second gear wheel 114.

Moreover, the auxiliary transmission brake arrangement 100 further comprises an auxiliary transmission brake valve 106 arranged in fluid communication between a source of pressurized fluid (not shown) of the vehicle 1 and the retarder 102. The source of pressurized fluid is preferably a source of pressurized air for supplying pressurized air to the retarder 102. The auxiliary transmission brake valve 106 is also connected to a control unit 120, which control unit 120 is arranged to control the operation of the auxiliary transmission brake valve 106. Thus, the control unit 120 is arranged to control the auxiliary transmission brake valve 106 between a first state in which pressurized fluid is provided to the auxiliary transmission brake 102 for actuation thereof, and a second state in which pressurized fluid is prevented from reaching the auxiliary transmission brake 102. Accordingly, when the auxiliary transmission brake valve 106 assumes the first state, pressurized air is provided to the retarder 102 for pushing the hydraulic fluid out from the reservoir (not shown) and into the volume formed between the static 102' and dynamic 102" retarder portions as described above.

Furthermore, the auxiliary transmission brake arrangement 100 also comprises a lubrication arrangement 116 connected to the transmission 10. The lubrication arrangement 116 comprises a lubrication actuator 118 in the form of a flow controllable lubrication valve which is arranged to supply lubricant to the gearing arrangement 110 when actuated. The lubricant is preferably provided from a suitable source of lubricant (not shown) of the transmission 10, e.g. a transmission lubricant pump. The lubrication actuator 118 is arranged in fluid communication with the auxiliary transmission brake valve 106. Hereby, the lubrication actuator 118 is arranged in an open position for allowing lubricant to be provided to the transmission 10 when pressurized air is supplied to the lubrication actuator 118. Also, as depicted in FIG. 2, the auxiliary transmission brake arrangement 100 comprises a nozzle 122 arranged in downstream fluid communication with the lubrication actuator 118. The nozzle 122 thus receives lubricant from the source of lubricant via the lubrication actuator 118 when pressurized air positions the lubrication actuator 118 in the open position. The nozzle 122 is in FIG. 2 arranged in the upper portion of the transmission 10. The nozzle 122 thus directs the lubricant towards the first gear wheel 112. The nozzle 122 may be arranged to spray a fume of lubricant towards the first gear wheel 112. The nozzle may also provide lubricant in the form of e.g. droplets, etc. to the first gear wheel 112.

During operation of the auxiliary transmission arrangement 100, pressurized air is provided to the retarder 102 when a braking request is provided. In detail, when the control unit 120 receives a signal indicative of a request to reduce the vehicle speed by means of the retarder 102, the control unit 120 controls the auxiliary transmission brake valve 106 to assume the first state, i.e. to arrange the auxiliary transmission brake valve 106 in the open position. Hereby, pressurized air controls the retarder 102 to provide a brake torque to the output shaft 104 via the gearing arrangement 110. The pressurized air is preferably provided to the retarder 102 via a first conduit 107. At the same time, pressurized air is supplied to the lubrication actuator 118 via a second conduit 109. The first 107 and second 109 conduits may preferably origin from a primary conduit 111 which is arranged downstream the auxiliary transmission brake valve 106. Other configurations are of course conceivable whereby the pressurized air directed through the auxiliary transmission brake valve 106 is directed to both the retarder 102 as well as to the lubrication actuator 118.

Accordingly, when the retarder 102 is actuated, pressurized air is supplied to the lubrication actuator 118. Hereby, the lubrication actuator 118 is arranged in the open position, whereby lubricant is directed from the source of lubrication to the nozzle 122, which in turn provides lubricant to the gearing arrangement 110.

The lubrication actuator 118 may be arranged as a variable flow controllable valve. In detail, when increasing the brake pressure of the retarder 102, i.e. increasing the pressure of pressurized fluid from the auxiliary transmission brake valve 106, the openness degree of the lubrication actuator 118 is increased. Hence, the amount of lubricant supplied to the nozzle 122 is increased proportionally to the brake torque generated by the retarder 102. Other types of lubrication actuators 118 are of course conceivable, such as a valve which is arranged in the open position only when the pressure level of the pressurized air exceeds a predetermined pressure level.

Figure 3:
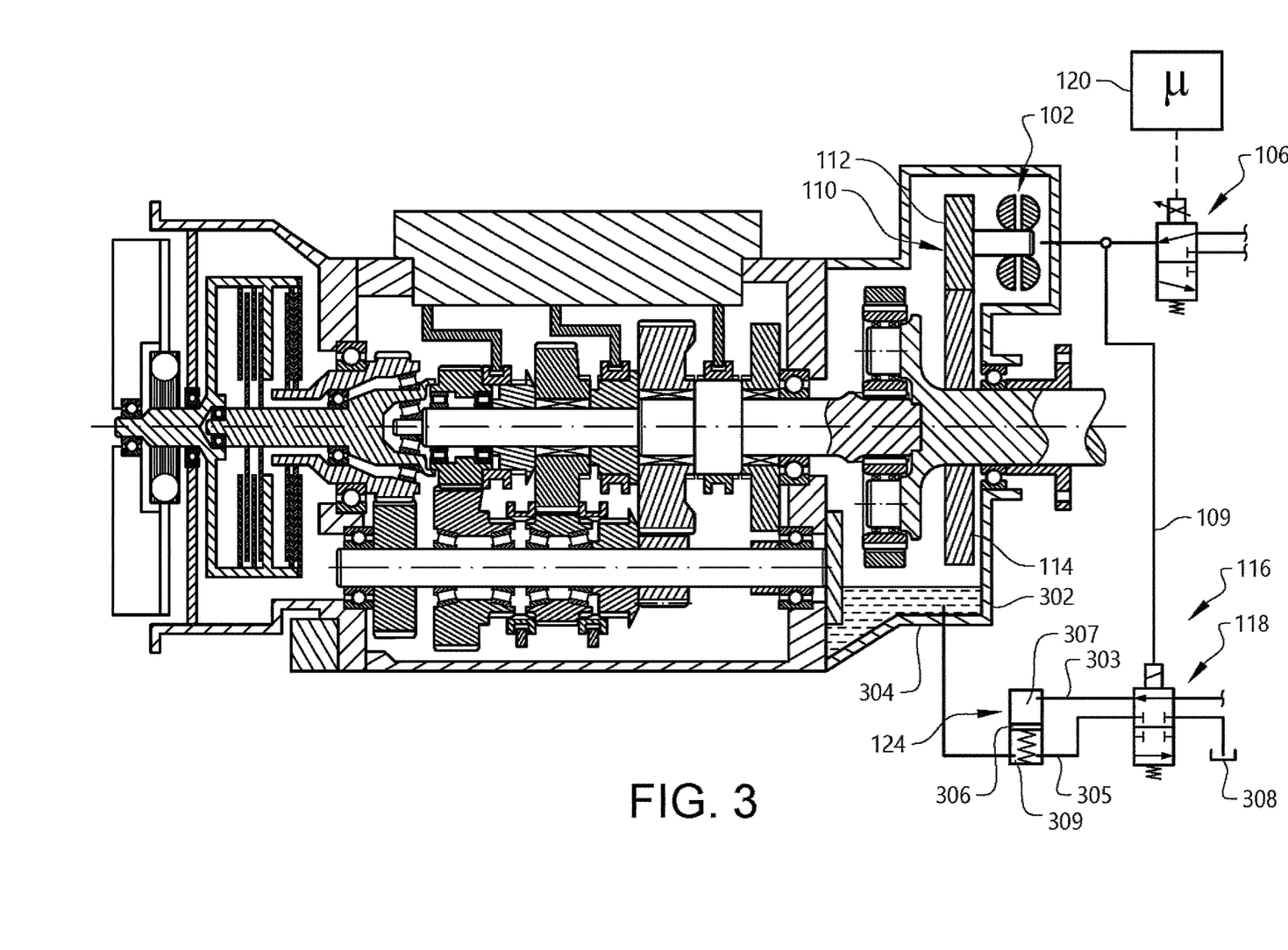
FIG. 3 is a cut-out side view of an auxiliary transmission brake arrangement according to another example embodiment.

Reference is now made to FIG. 3 which illustrates the auxiliary transmission brake arrangement 100 according to another example embodiment. The following will only describe the features which differ from the above example embodiment described in relation to FIG. 2.

As can be seen in FIG. 3, the lubrication arrangement 116 is positioned in connection to a lower portion of the transmission 10. In detail, the lubrication arrangement 116 is connected to the gearbox housing 302 of the transmission 10 at a lower portion 304 thereof. The lubrication arrangement 116 depicted in FIG. 3 comprises a lubricant pump arrangement 124. When pressurized air is provided to the lubrication actuator 118, in the same manner as described in relation to FIG. 2, the lubrication actuator 118 is arranged in the open position for providing lubricant to a piston rod side 307 of the lubricant pump arrangement 124 via a first pump conduit 303. Hereby, the piston 306 of the lubricant pump arrangement 124 pushes lubricant present at the piston side 309 into the lower portion 304 of the gearbox housing 302 in the vicinity of the second gear wheel 114. Hereby, the second gear wheel 114 will be "dipped" into the lubricant, i.e. the lubrication arrangement 116 provides so-called dip lubrication to the second gear wheel 114.

It should be understood that the lubrication arrangement 116 in FIG. 3 may be arranged in different ways in comparison to what is depicted in FIG. 3. For example, the piston 306 may be arranged such that the piston rod side 307 is arranged in fluid communication with the lower portion 304 of the gearbox housing 302, while the piston side is arranged in fluid communication with the lubrication actuator 118. Also, it may not be necessary to provide lubricant to the lubricant pump arrangement 124 from the lubrication actuator 118. In such case, the lubricant can be present in the volume between the piston side 309 of the lubricant pump arrangement 124 and the gearbox housing, and another fluid is arranged to push the piston 306 to provide the lubricant into the gearbox housing.

Furthermore, the lubricant pump arrangement 124 may also be arranged to remove lubricant from the lower portion 304 of the gearbox housing 302 when the retarder 102 is not in operation. In such situation, the lubricant pump arrangement 124 sucks the lubricant out from the gearbox housing 302 and into e.g. a tank 308 or the like via a second pump conduit 305.

Figure 4:
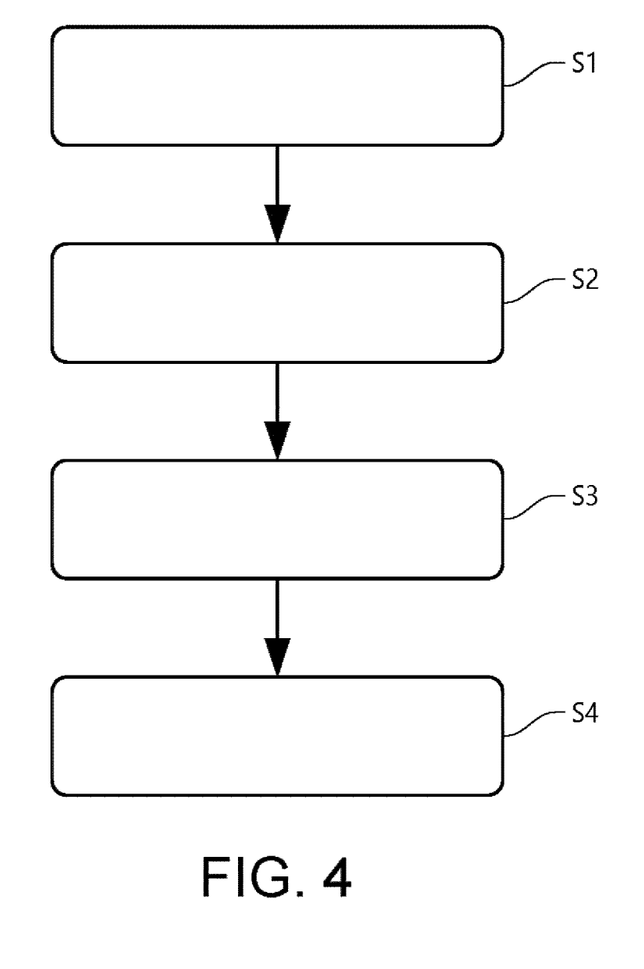
FIG. 4 is a flow chart of a method for controlling an auxiliary transmission brake arrangement according to an example embodiment.

Finally, in order to sum up, reference is made to FIG. 4 which is a flow chart of a method for controlling the auxiliary transmission brake arrangement 100 according to an example embodiment. Firstly, when there is braking request, i.e. a desire to utilize the retarder 102 for reducing the vehicle speed, pressurized fluid is supplied S1 to the auxiliary braking arrangement 100. The auxiliary transmission brake valve 106 is hereby controlled by means of the control unit 120 to assume the first state, i.e. to be arranged in the open position. A first portion of the supplied pressurized fluid is provided S2 to the retarder 102 for actuation thereof. A second portion of the supplied pressure is at substantially the same time provided S3 to the lubrication arrangement 118 for actuation thereof. The lubrication arrangement 118 is thus arranged in the open position, whereby lubricant from the lubrication arrangement 116 is provided S4 to the gearing arrangement.

It is to be understood that the present invention is not limited to the embodiments described above and illustrated in the drawings; rather, the skilled person will recognize that many changes and modifications may be made within the scope of the appended claims. It should also be readily understood that the above described steps can be executed simultaneously and the above described order is merely for simplicity of understanding.

The invention claimed is:

1. An auxiliary transmission brake arrangement for a transmission of a vehicle, the auxiliary transmission brake arrangement comprising:
   an auxiliary transmission brake arranged to controllably provide an auxiliary brake torque to an output shaft of the transmission;
   an auxiliary transmission brake valve arranged in fluid communication with the auxiliary transmission brake and connectable to a source of pressurized fluid of the vehicle, the auxiliary transmission brake valve being controllable between a first state in which pressurized fluid is provided to the auxiliary transmission brake for actuation thereof, and a second state in which pressurized fluid is prevented from reaching the auxiliary transmission brake;
   a gearing arrangement and a second gear wheel arranged in meshed connection with each other, the first gearwheel being drivingly connected to the auxiliary transmission brake and the second gearwheel being drivingly connected to the output shaft of the transmission; and
   a lubrication arrangement connected to the transmission, the lubrication arrangement comprising a lubrication actuator arranged to supply lubricant to the gearing arrangement when being actuated, wherein the auxiliary transmission brake valve is further arranged in fluid communication with the lubrication actuator such that pressurized fluid is supplied to the lubrication actuator for actuation thereof when the auxiliary transmission brake valve assumes the first state.

2. The auxiliary transmission brake arrangement according to claim 1, wherein the lubrication actuator is a flow controllable lubrication valve, the flow controllable lubrication valve being controllable in an open position for supplying lubricant to the gearing arrangement when receiving pressurized fluid from the auxiliary transmission brake valve.

3. The auxiliary transmission brake arrangement according to claim 2, wherein the flow controllable lubrication valve is arranged in the open position when the pressure level of the pressurized fluid exceeds a predetermined pressure limit.

4. The auxiliary transmission brake arrangement according to claim 2, wherein the flow controllable lubrication valve is a variable flow controllable lubrication valve, wherein the openness degree of the variable flow controllable lubrication valve is dependent on the pressure level of the pressurized fluid received from the auxiliary transmission brake valve.

5. The auxiliary transmission brake arrangement according to claim 4, wherein the variable flow controllable lubrication valve is arranged in a fully open position when the pressure level of the pressurized fluid exceeds a predetermined pressure limit.

6. The auxiliary transmission brake arrangement according to claim 1, further comprising a control unit, the control unit being arranged to:
   receive a signal indicative of a braking request for the vehicle, and
   control the auxiliary transmission brake valve to be arranged in the first state.

7. The auxiliary transmission brake arrangement according to claim 1, wherein the second gear wheel is fixedly connected to the output shaft.

8. The auxiliary transmission brake arrangement according to claim 1, further comprising a nozzle arranged in downstream fluid communication with the lubrication actuator for supplying the lubricant to the gearing arrangement.

9. The auxiliary transmission brake arrangement according to claim 8, wherein the nozzle is a spray nozzle arranged to spray a fume of lubricant towards the first gear wheel.

10. The auxiliary transmission brake arrangement according to claim 1, wherein the lubrication arrangement is arranged to supply lubricant towards the second gear wheel.

11. The auxiliary transmission brake arrangement according to claim 10, further comprising a lubricant controlling arrangement arranged in fluid communication between the lubrication actuator and a lower portion of a gearbox housing for the transmission, wherein the lubricant controlling arrangement is arranged to remove lubricant from, or add lubricant to, the lower portion.

12. The auxiliary transmission brake arrangement according to claim 11, wherein the lubricant controlling arrangement is arranged to remove lubricant from the lower portion of the gearbox housing when the auxiliary transmission brake valve assumes the second state.

13. A vehicle comprising a transmission provided with an auxiliary transmission brake arrangement according to claim 1.

14. A method for controlling an auxiliary transmission brake arrangement for a transmission of a vehicle, the auxiliary transmission brake arrangement comprising:
   an auxiliary transmission brake arranged to controllably provide an auxiliary brake torque to an output shaft of the transmission;
   a gearing arrangement comprising a first and a second gear wheel arranged in meshed connection with each other, the first gear wheel being drivingly connected to the auxiliary transmission brake and the second gear wheel being drivingly connected to the output shaft of the transmission; and
   a lubrication arrangement connected to the transmission and arranged to supply lubricant to the gearing arrangement, the method comprising the steps of:

supplying pressurized fluid to the auxiliary transmission brake arrangement upon a braking request;

providing a first portion of the supplied pressurized fluid to the auxiliary transmission brake for actuation thereof;

providing a second portion of the supplied pressurized fluid to the lubrication arrangement for actuation thereof; and providing lubricant from the lubrication arrangement to the gearing arrangement.

15. A computer program comprising program code means for performing the steps of claim 14 when the program is run on a computer.

16. A computer readable medium carrying a computer program comprising program means for performing the steps of claim 14 when the program means is run on a computer.

\* \* \* \* \*